(12) United States Patent
New

(10) Patent No.: US 9,976,666 B1
(45) Date of Patent: May 22, 2018

(54) BUTTERFLY VALVE ASSEMBLY

(71) Applicant: Bobby New, Oakdale, CA (US)

(72) Inventor: Bobby New, Oakdale, CA (US)

( * ) Notice: Subject to any disclaimer, the term of this patent is extended or adjusted under 35 U.S.C. 154(b) by 140 days.

(21) Appl. No.: 15/040,435

(22) Filed: Feb. 10, 2016

(51) Int. Cl.
*F16K 27/02* (2006.01)
*F16K 1/226* (2006.01)

(52) U.S. Cl.
CPC ........ *F16K 27/0218* (2013.01); *F16K 1/2263* (2013.01)

(58) Field of Classification Search
CPC ............................ F16K 27/0218; F16K 1/2263
USPC .......................................... 251/304–308, 367
See application file for complete search history.

(56) References Cited

U.S. PATENT DOCUMENTS

| 2,793,002 A | 5/1957 | Kellar |
| 2,936,778 A | 5/1960 | Stillwagon |
| 2,994,342 A | 8/1961 | Stillwagon |
| 3,633,872 A * | 1/1972 | Wright ................... F16K 1/2265 251/306 |
| 3,752,181 A | 8/1973 | Morris |
| 4,562,860 A | 1/1986 | Walter et al. |
| 4,998,708 A * | 3/1991 | Pavanel ................ F16K 1/2263 251/306 |
| 7,353,801 B2 * | 4/2008 | Winkelmuller ....... F02D 9/1015 123/336 |

FOREIGN PATENT DOCUMENTS

GB            2520309 A  *   5/2015

* cited by examiner

*Primary Examiner* — Marina Tietjen
(74) *Attorney, Agent, or Firm* — John P. Costello; Costello Law Corp.

(57) ABSTRACT

The invention is a butterfly valve assembly for aboveground pipelines wherein the valve assembly is inserted between adjacent pipe sections, the pipe sections terminating in a pipe flange. The invention has a valve body which can be directly attached to the pipe flanges of adjacent pipe sections by welding, for example. The valve body includes first and second flange abutment members which align with the flanges of the adjacent pipe sections and can be permanently fastened to the flanges. The butterfly valve and valve seal can be removed from the valve body and replaced or serviced without having detach the remainder of the valve body from the pipeline.

20 Claims, 7 Drawing Sheets

BUTTERFLY VALVE ASSEMBLY

1. TECHNICAL FIELD

This invention relates to a valve assembly which is used to regulate the flow of fluid materials in above-ground pipelines, and more specifically, to a butterfly valve assembly whose primary internal components can be removed from a pipeline for repair or replacement without having to disassemble the surrounding pipeline containing the valve assembly.

2. BACKGROUND

Above-ground pipelines are well known for transporting fluid materials of various types from a first location to a second one. Tank farms for transporting oil or even wine are well known uses for above-ground pipelines. Butterfly valves of various types are ubiquitous and positioned in-line in a pipeline to regulate the flow of fluid materials. The mechanical opening and closing of the butterfly valves causes wear on valve seals and metal parts, necessitating that the butterfly valves present in above-ground pipelines have their components serviced or replaced at regular intervals, usually every 180 days in the case of tank farm facilities which experience industrial-level use.

In the past, servicing or replacement of in-line butterfly valves or their components required that the pipeline be disassembled. To do so meant that the valve be unbolted from the flanges of adjacent pipe sections, which required the pipe sections to be supported by jacks to keep the adjacent pipe sections from sagging while the in-line valve is replaced and bolted up to the flanges of the adjacent pipe sections.

Removable in-line valves which allow partial removal and replacement of parts have been in existence for quite some time, reference U.S. Pat. No. 3,752,181, issued to Morris et al. However, the problem of removing the valve from adjacent pipe flanges remains, necessitating a more complex and time consuming procedure of having to support the pipe sections on jacks or cradles remains. This added timely repair procedure becomes costly as entire sections of a tank farm have to be shut down, thus affecting productivity.

Therefore a need exists for a butterfly valve assembly for inline placement in above-ground pipelines which is capable of quick change-out for repair or replacement, which reduces down-time to the minimal amount necessary.

The foregoing reflects the state of the art of which the inventor is aware, and is tendered with a view toward discharging the inventor's acknowledged duty of candor, which may be pertinent to the patentability of the present invention. It is respectfully stipulated, however, that the foregoing discussion does not teach or render obvious, singly or when considered in combination, the inventor's claimed invention.

SUMMARY OF THE INVENTION

The invention is an inventive butterfly valve assembly for above-ground pipelines wherein the valve assembly is inserted between adjacent pipe sections, the pipe sections terminating in a pipe flange. The invention has a valve body which can be directly attached to the pipe flanges of adjacent pipe sections by welding, for example. The valve body includes first and second flange abutment members which align with the flanges of the adjacent pipe sections and can be permanently fastened to the flanges, by welding. The flange abutment members are preferably attached, as part of an integral unit, to a second valve seat section, wherein a first valve seat section is detachable from the integral unit. The first valve seat section is adapted to receive a flow-regulating member, in this case a butterfly valve, which is operable by rotating a valve stem, the valve stem communicating to the flow regulating member from the outside of the first valve seat section. The first and second valve seat sections communicate with a valve seal which seats in the first and second valve seat sections, through tongue-in-groove engagement. The valve seal surrounds the flow regulating member and provides a surface against which the flow regulating member imparts force and is flexibly and sealingly engaged to cut off the flow of fluid materials when in the closed position. When the flow regulating member is put in an open orientation, it is substantially free of the valve seal and the flow of fluid materials through the pipeline resumes. The tongue-in-groove engagement of the valve seal insures easy alignment and precise positioning of the valve seal during repair and replacement.

The valve seal is preferably comprised of a metal skeleton surrounded by a sealing material such as ethylene propylene diene monomer (EPDM). The metal skeleton gives the valve seal sufficient integrity so that it remains in place seated in the first and second valve seat sections and can withstand repeated openings and closings of the flow regulating member.

The valve seal and flow regulating member represent the internal components of the inventive valve assembly which can wear and break. Removal of the first valve seat section allows the flow regulating member and valve seal to be accessed and removed from the integral unit which remains permanently joined to the pipe flanges of adjacent pipe sections. A new valve seal and flow regulating member can be changed out for the worn unit and inserted into the integral unit. The first valve seat section is then reattached with the integral unit, completing the cycle.

BRIEF DESCRIPTION OF THE DRAWINGS

The invention will be more fully understood by reference to the following drawings which are for illustrative purposes only.

DETAILED DESCRIPTION OF THE PREFERRED EMBODIMENTS

Butterfly valves of various types have been installed in above-ground pipelines to regulate the flow of fluid materials for many years. Applications of above-ground pipelines are typically seen in the form of cross-country oil lines, or tank farms, where lines connect systems of tanks containing fluid materials such as petroleum products, for example.

Figure 1:
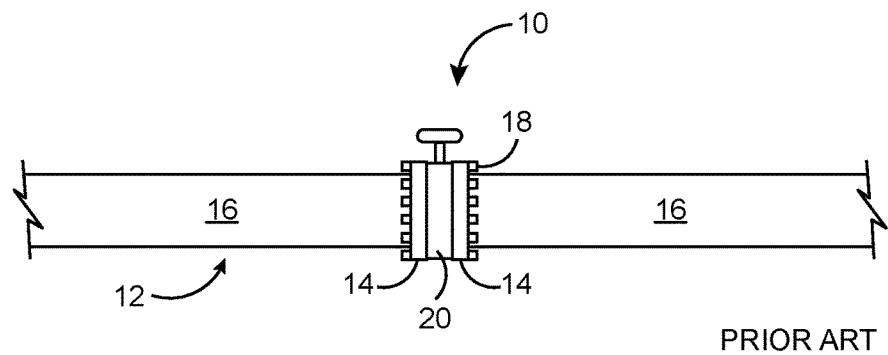
FIG. 1 is a side view of a prior art butterfly valve assembly attached to a pipeline.

FIG. 1 represents a typical prior-art butterfly valve assembly 10 which is part of an above-ground pipeline 12. The valve assembly 10 is typically attached between pipe flanges 14 of adjacent pipe sections 16 by bolting to the pipe flanges 14, creating a rigid assembly. Periodically, the components of butterfly valve assemblies can become worn or broken, necessitating entry into the valve body to access the inner components of the valve assembly. Entry into a prior art valve body 20 required removal of numerous flange bolts 18 to service the interior components or to remove and replace the entire valve assembly 10. Re-assembly also required replacing and tightening the numerous bolts 18 to adjacent pipe flanges 14 and valve body 20. When the valve assembly is removed, the pipeline must be supported on jacks (not shown) to prevent pipeline sagging and damage that can result. The servicing of prior art butterfly valve assemblies results in significant down-time and loss of productivity.

Figure 2:
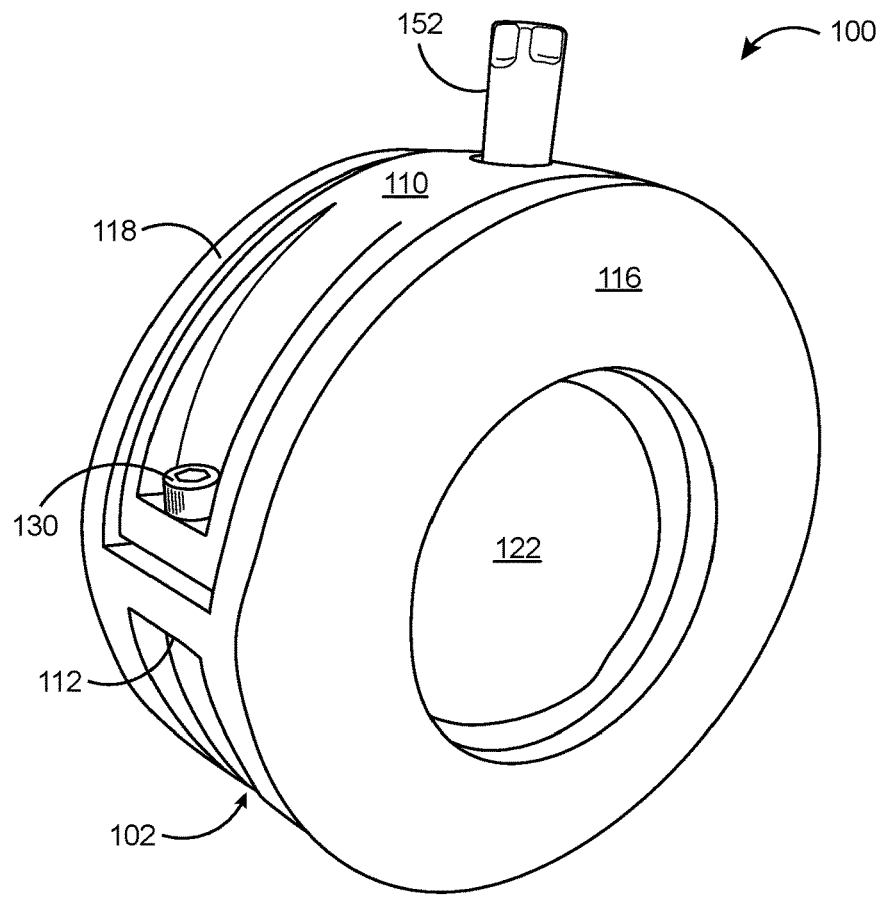
FIG. 2 is a perspective view of the valve assembly of the present invention.
Figure 3:
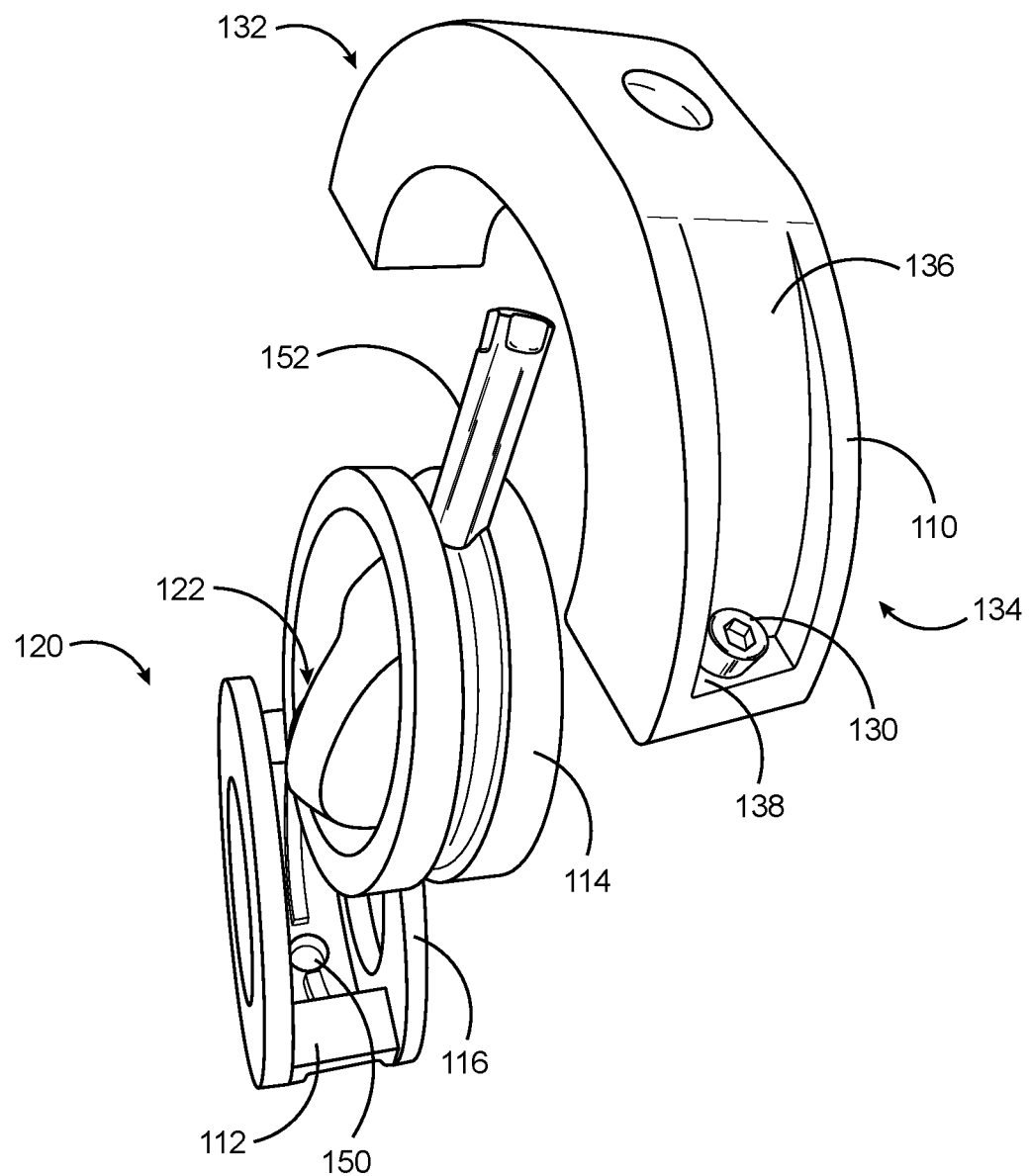
FIG. 3 is an exploded view of the inventive valve assembly of FIG. 2.

FIG. 2 is a valve assembly 100 that is representative of the invention, this embodiment showing how the invention would appear in a butterfly valve application. FIG. 3 is an exploded view of the butterfly valve assembly 100 introduced in FIG. 2. The inventive butterfly valve assembly 100 is comprised of a valve body 102 which can be directly attached to the pipe flanges 104 of adjacent pipe sections 106 by welding, for example (Refer to FIG. 9). The valve body 102 is permanently attached and remains in-line with the surrounding pipeline 108 while the butterfly valve components are being serviced or replaced. This permanent attachment of the valve body 102 insures that the integrity of the pipeline remains intact during servicing of the valve assembly 100. Therefore by employing the invention, separation of adjacent pipe sections 106 is obviated along with the need to support the adjacent pipes by jacks or other means while the pipe sections 106 are separated.

The valve body 102 is comprised of valve seat sections 110, 112 which receive and seat a valve seal 114 therein. In the present embodiment a first valve seat section 110 and a second valve seat section 112 are disposed between first and second flange abutment members 116, 118. First and second flange abutment members 116, 118 and second valve seat section 112 are preferably joined as an integral unit 120. First and second flange abutment members and second valve seat section are joined in a sealing manner to prevent leakage of fluid materials. A sealing integral unit 120 formed or forged is a preferred method, wherein the materials used are piping materials identical to that of the adjacent pipe sections 106 so as to preserve similar characteristics of expansion, contraction and flexion with surrounding materials.

Figure 4:
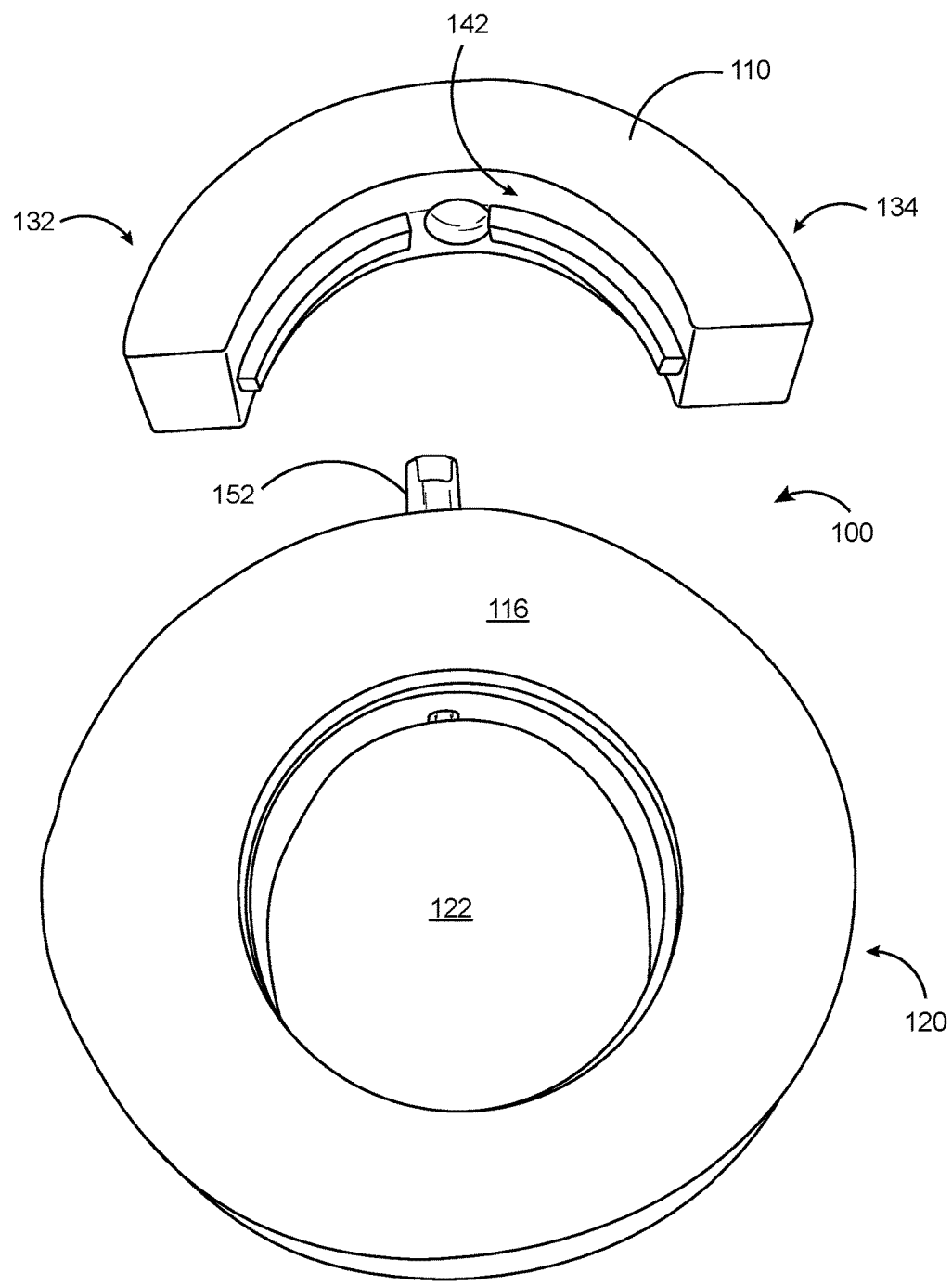
FIG. 4 is a side view showing the first valve seat section detached from the remainder of the valve assembly.
Figure 5:
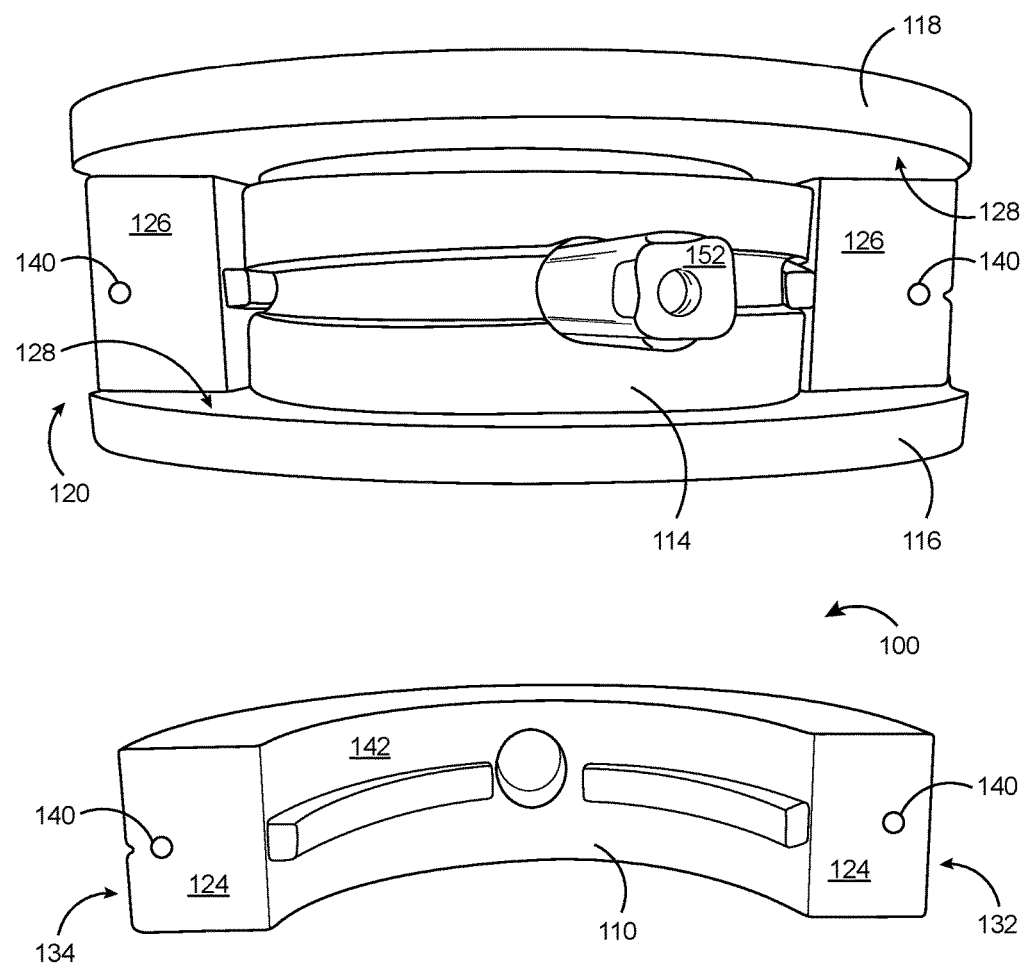
FIG. 5 is a plan view of the butterfly valve assembly with the first valve seat section removed and inverted to show the mating surfaces and interior valve seat surface.

First valve seat section 110 is detachable from the integral unit 120, yet, along with valve seal 114 forms a sealing engagement with the integral unit as described further herein. As shown in FIG. 4, first valve seat section 110 detaches from the integral unit 120, leaving the butterfly valve 122 and its surrounding valve seal 114 exposed for servicing or replacement. First valve seat section 110 and second valve seat section 112 engage along mating surfaces 124, 126 as shown in FIG. 5. The two valve seat sections 110, 112 are coupled together with fasteners; in the drawings, a hex bolt 130 applied to each side 132, 134 of the first valve seat section 110 acts to fasten the first valve seat section 110 to the second valve seat section 112. As first valve seat section is tightened with hex bolts 130, the valve seal 114 is sized to compress against the tongue 144, against interior sides 128 of flange abutment members 116, 118, and against valve seat surfaces 142 to create a sealing engagement. On each side of the exterior surface of the first valve seat section is machined a ledge 138 to accommodate the head of hex bolt 130. Hex bolt 130 threads into a threaded hole 140 in first and second valve seat sections 110, 112 to accomplish the coupling together of the two pieces.

Figure 6:
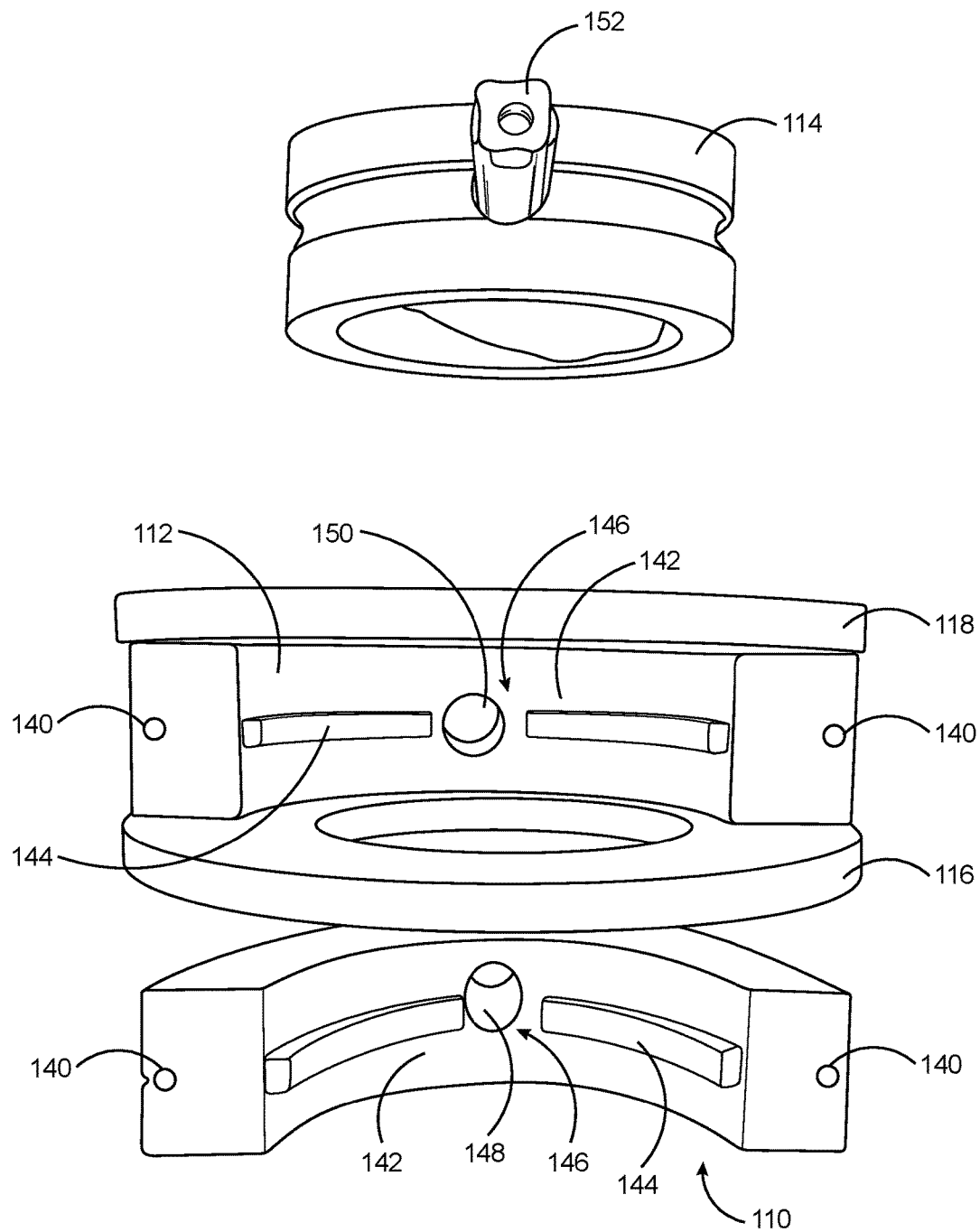
FIG. 6 is a plan view of the butterfly valve assembly with the butterfly valve components and valve seal removed; the first valve seat section has been removed and is inverted to show the features of its interior valve seat surface.

In FIG. 6, the details of the valve seat sections 110, 112 are shown. First valve seat section 110 is semi-circular so as to follow the general line of the flange abutment members 116, 118 and also to engage with the circular valve seat 114. An exterior top surface 136 lies opposite the interior valve seat surface 142 wherein the valve seal 114 is seated against. Seating is accomplished through a tongue-in-groove engagement between the valve seal 114 and valve seat surface 142 of the first and second valve seat sections. This view illustrates the tongue in groove engagement between the valve seat sections 110, 112 and the valve seal 114. Valve seat sections 110, 112 incorporate an upwardly-protruding tongue 144 which follows the concave semi-circular shape of the first and second valve seat surfaces 142. The tongue 144 is centered on the valve seat surfaces 142 and is only broken at the apex 146 of the tongue 144, first by a through-hole 148 in the first valve seat section 110 and a cavity 150 in the second valve seat section 112, the through-hole accommodating the upper end 151 of valve shaft 152 and cavity 150 for accommodating the lower end 153 of valve shaft 152. Through-hole 148 allows the valve shaft 152 to communicate from the interior to the exterior of the valve body. Exterior to the valve body would be a mechanical or manual lever or actuator (not shown) which operates the opening and closing of the butterfly valve. Bushings 157 and bolts 159 help retain valve shaft 154 to butterfly valve 122.

The valve seal 114 incorporates a groove 154 in its circumference which engages with the tongue 144 of the first and second valve seat sections 110, 112. Groove 154 is preferably tapered 155 so that when first valve seat section 110 is tightened, the tongue 144 is pushed into the tapered groove 154 to enhance sealing properties. The groove 154 of the valve seal 114 is likewise centered to perfectly align with the centered tongue 144 of the valve seat sections. When the butterfly valve 122 and valve seal 114 are inserted into the integral unit 120, the tightening of the first valve seat section 110 to the integral unit 120 causes the valve seal 114 to seat upon the tongue 144 with tongue in groove engagement. The seating of the valve seal 114 against the valve seat surfaces 142 prevents any passage of fluid materials from one side of the valve seal to the other.

Figure 7:
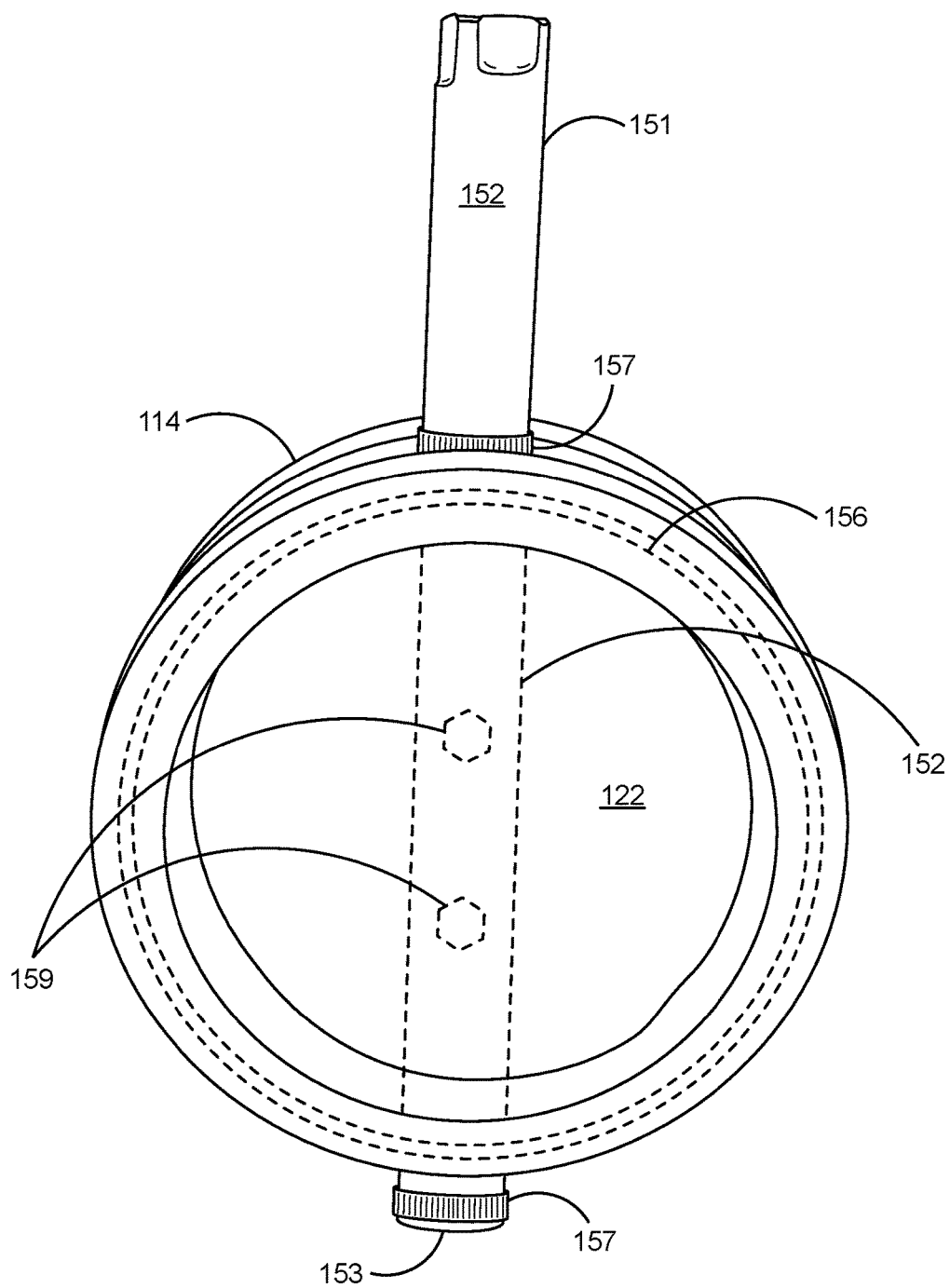
FIG. 7 is a perspective view of the valve seal and butterfly valve components of the invention with the internal metallic skeleton of the valve seal shown in phantom.
Figure 8:
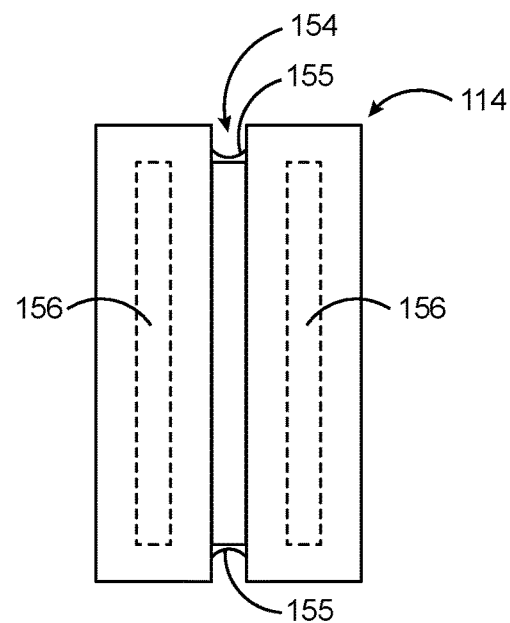
FIG. 8 is a side view of the valve seal with the internal metallic skeleton of the valve seal shown in phantom; the butterfly valve and valve shaft are removed in this view.

Referring to FIGS. 7 and 8 the valve seal has an internal metallic skeleton 156 (shown in phantom) that is both rigid and flexible at the same time. The preferred metallic composition for the metallic skeleton 156 is stainless steel. The butterfly valve 122 is attached to a valve stem 152 which protrudes to the exterior of the valve assembly 110. The valve stem 152 couples to any turning mechanism, mechanical or manual. When the valve stem 152 is rotated to a closed position, the butterfly valve 122 engages the valve seal 114 in a sealing manner to close off the flow of fluid materials through the valve assembly. The combination of rigidity and flexibility imparted into the valve seal 114 by the metallic skeleton 156 insures a proper seal with good wear characteristics.

Figure 9:
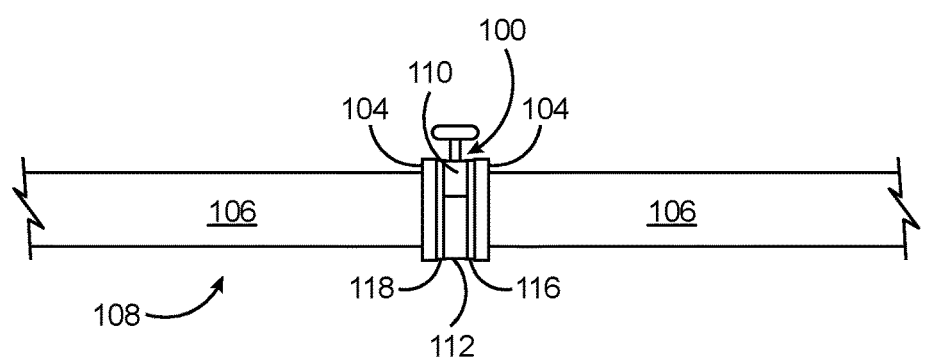
FIG. 9 is a side view of the butterfly valve assembly of the present invention shown permanently attached to adjacent pipe sections of a pipeline.

FIG. 9 demonstrates how the invention 110 would be inserted between adjacent pipe sections 106 and permanently attached to the adjacent sections. The inventive valve assembly 110 could be applied during the new construction of pipelines 108 or else it could be used as a replacement for existing butterfly valves assemblies. The flange abutment members 116, 118 are contacted by the flanges 104 of adjacent pipe sections 106 and permanently welded thereto. Flange abutment members 116, 118 are preferably formed as an integral unit with second valve seat section 112 and permanently attached to flanges of adjacent pipe sections, through welding, for example. The butterfly valve and valve seal would next be inserted into the integral unit and enclosed by the first valve seat section. The first valve seat section would be coupled to the second valve seat section in a sealing manner by threaded hex bolts as described herein. Tightening to an appropriate degree would seat valve seal in the valve seat sections, thereby completing the valve assembly.

A pipeline incorporating the inventive valve assembly would experience significant time savings during repair and replacement of the internal valve seal and butterfly valve components. Complicated and time consuming steps of removing and replacing a multitude of flange bolts and supporting the lines with jacks are eliminated. Instead, removing the first valve seat section and servicing or replacing the internal components of the valve assembly greatly simplifies and reduces the time involved in routine maintenance of pipelines employing butterfly valves.

Finally, although the description above contains much specificity, this should not be construed as limiting the scope of the invention, but as merely providing illustrations of some of the presently preferred embodiments of this invention. This invention may be altered and rearranged in numerous ways by one skilled in the art without departing from the coverage of any patent claims, which are supported by this specification.

The invention claimed is:

1. A valve assembly for insertion between adjacent opposing pipe sections wherein each pipe section is terminated by a flange, said valve assembly comprising:
   a valve body comprised of:
   a) a first valve seat section, said first valve seat section further comprising a first internal valve seat, said first valve seat section further comprising a through-hole imparted through said first valve seat section, said through-hole for receiving a valve stem;
   b) a second valve seat section, said second valve seat section further comprising a second internal valve seat;
   c) first and second flange abutment members wherein said first valve seat section and said second valve seat section are sealingly disposed between said first and second flange abutment members;
   a flow-regulating member, said flow regulating member being movable within with a valve seal, said valve stem being attached to said flow regulating member and wherein rotation of said stem moves said flow regulating member between an open flow position and a closed flow position within said valve seal;
   wherein said valve seal rests within said first and second valve seat sections;
   said first valve seat section and said second valve seat section sealingly fastening together.

2. The valve assembly as recited in claim 1, wherein said second valve seat section forms an integral unit with said first and second flange abutment members, said first valve seat section being separable from said integral unit.

3. The valve assembly as recited in claim 2, wherein said valve seal engages with said first valve seat section and said second valve seat section in a tongue-in-groove manner.

4. The valve assembly as recited in claim 3, wherein said first internal valve seat and said second internal valve seat further comprises a tongue member.

5. The valve assembly as recited in claim 4, wherein said valve seal further comprises a groove, said groove engaging with said tongue member of said first internal valve seat and said second internal valve seat.

6. The valve assembly as recited in claim 5, wherein said valve seal is comprised of a metal skeleton enclosed inside a sealing material.

7. The valve assembly as recited in claim 6, wherein said metal skeleton is further comprised of stainless steel.

8. The valve assembly as recited in claim 6, wherein said sealing material is EPDM.

9. A butterfly valve assembly for insertion between adjacent opposing pipe sections wherein each pipe section is terminated by a flange, said butterfly valve assembly comprising:
   a valve body comprised of:
   a) a first valve seat section, said first valve seat section further comprising a first internal valve seat, said first valve seat section further comprising a through-hole imparted through said first valve seat section, said through-hole for receiving a valve stem;
   b) a second valve seat section, said second valve seat section further comprising a second internal valve seat;
   c) first and second flange abutment members wherein said first valve seat section and said second valve seat section are sealingly disposed between said first and second flange abutment members;
   a butterfly valve, said butterfly valve being movable within with a valve seal, said valve stem being attached to said butterfly valve and wherein rotation of said stem moves said butterfly valve between an open flow position and a closed flow position within said valve seal;
   Wherein said valve seal rests within said first and second valve seat sections;
   said first valve seat section and said second valve seat section sealingly fastening together.

10. The butterfly valve assembly as recited in claim 9, wherein said second valve seat section forms an integral unit with said first and second flange abutment members, said first valve seat section being separable from said integral unit.

11. The butterfly valve assembly as recited in claim 10, wherein said valve seal engages with said first valve seat section and said second valve seat section in a tongue-in-groove manner.

12. The butterfly valve assembly as recited in claim 11, wherein said first internal valve seat and said second internal valve seat further comprises a tongue member.

13. The butterfly valve assembly as recited in claim 12, wherein said valve seal further comprises a groove, said groove engaging with said tongue member of said first internal valve seat and said second internal valve seat.

14. The butterfly valve assembly as recited in claim 13, wherein said valve seal is comprised of a metal skeleton enclosed inside a sealing material.

15. The butterfly valve assembly as recited in claim 14, wherein said metal skeleton is further comprised of stainless steel.

16. The butterfly valve assembly as recited in claim 15, wherein said sealing material is EPDM.

17. A butterfly valve assembly for insertion between adjacent opposing pipe sections wherein each pipe section is terminated by a flange, said butterfly valve assembly comprising:
 a valve body comprised of:
  a) a first valve seat section, said first valve seat section further comprising a first internal valve seat, said first internal valve seat further comprising a raised tongue centrally positioned on said first internal valve seat, said first valve seat section further comprising a through-hole imparted through said first valve seat section, said through-hole for receiving a valve stem;
  b) a second valve seat section, said second valve seat section further comprising a second internal valve seat said second internal valve seat further comprising a raised tongue centrally positioned on said second internal valve seat;
  c) first and second flange abutment members wherein said second valve seat section is attached to said first and second flange abutment members to form an integral unit;
  d) wherein said first valve seat section is, sealingly disposed between said first and second flange abutment members, said first valve seat section being detachable from said integral unit;
 a butterfly valve, said butterfly valve being movable within with a valve seal, said valve seal further comprising a circumferential groove, said groove engaging said raised tongue of said first and second internal valve seats;
 said valve stem being attached to said butterfly valve and wherein rotation of said stem moves said butterfly valve between an open flow position and a closed flow position within said valve seal;
 wherein said valve seal rests within said first and second valve seat sections;
 said first valve seat section and said second valve seat section sealingly fastening together.

18. The butterfly valve assembly as recited in claim 17, wherein said valve seal is comprised of a metal skeleton enclosed inside a sealing material.

19. The butterfly valve assembly as recited in claim 18, wherein said metal skeleton is further comprised of stainless steel.

20. The butterfly valve assembly as recited in claim 19, wherein said sealing material is EPDM.

\* \* \* \* \*